(12) United States Patent
Inoue et al.

(10) Patent No.: US 9,742,296 B2
(45) Date of Patent: Aug. 22, 2017

(54) ISOLATED DC-DC POWER CONVERSION CIRCUIT SYSTEM WITH CIRCULATING CURRENT REDUCTION

(71) Applicant: TOYOTA JIDOSHA KABUSHIKI KAISHA, Toyota-shi, Aichi-ken (JP)

(72) Inventors: Shuntaro Inoue, Nagakute (JP);
Kenichi Takagi, Nagakute (JP);
Takahide Sugiyama, Nagakute (JP);
Kenichiro Nagashita, Susono (JP);
Masaki Okamura, Toyota (JP);
Yoshitaka Niimi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/064,084

(22) Filed: Mar. 8, 2016

(65) Prior Publication Data
US 2016/0276940 A1 Sep. 22, 2016

(30) Foreign Application Priority Data

Mar. 19, 2015 (JP) .................................. 2015-056260

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 3/33584* (2013.01); *H02M 2001/0009* (2013.01)

(58) Field of Classification Search
CPC ..... H02M 2001/0009; H02M 3/33546; H02M 3/33584; H02M 1/08; H02M 3/33523;
(Continued)

(56) References Cited

U.S. PATENT DOCUMENTS

| | | |
|---|---|---|
| 2009/0059622 A1 | 3/2009 | Shimada et al. |
| 2011/0198933 A1 | 8/2011 | Ishigaki et al. |

(Continued)

FOREIGN PATENT DOCUMENTS

| | | |
|---|---|---|
| JP | 2009-055747 A | 3/2009 |
| JP | 2011-193713 A | 9/2011 |

(Continued)

*Primary Examiner* — Alex Torres-Rivera
(74) *Attorney, Agent, or Firm* — Oliff PLC (57) ABSTRACT

The present invention provides a power conversion circuit system in which a circulating current can be reduced by accurately detecting the circulating current, to thereby improve efficiency in power conversion. The power conversion circuit system includes a power conversion circuit composed of a primary conversion circuit having left and right arms and a secondary conversion circuit having left and right arms, and a control circuit for controlling switching of switching transistors in the primary and secondary conversion circuits. The control circuit detects the circulating current at at least one of timings lagged by $\pi/2+\phi/2$ from at least either a peak timing or a valley timing in a carrier counter where $\phi$ represents a difference in phase between the primary and secondary conversion circuits, and performs feedback control for reducing the detected circulating current to zero.

3 Claims, 7 Drawing Sheets

(58) Field of Classification Search
CPC ........... H02M 3/33507; H02M 3/3353; H02M 3/33569
USPC .................................................... 363/15, 17
See application file for complete search history.

(56) References Cited

U.S. PATENT DOCUMENTS

2011/0249472 A1* 10/2011 Jain .................. H02M 3/33584
363/15
2014/0286055 A1 9/2014 Takagi et al.
2014/0313784 A1* 10/2014 Strzalkowski .... H02M 3/33584
363/17

FOREIGN PATENT DOCUMENTS

| JP | 2014-030355 A | 2/2014 |
| JP | 2014-187729 A | 10/2014 |

* cited by examiner

FIG. 4A  $\Phi \leq \delta - \pi$

FIG. 4B  $\Phi \geq \delta - \pi$

ISOLATED DC-DC POWER CONVERSION CIRCUIT SYSTEM WITH CIRCULATING CURRENT REDUCTION

PRIORITY INFORMATION

This application claims priority to Japanese Patent Application No. 2015-056260 filed on Mar. 19, 2015, the entire disclosure of which is incorporated herein by reference.

FIELD

The present invention relates to a power conversion circuit system, and, in particular, to a power conversion circuit system having multiple input and output ports.

BACKGROUND

With the growing development and widespread proliferation of electricity rich vehicles, such as a hybrid vehicle, an electric vehicle, or a fuel cell vehicle, power supply circuits mounted on such vehicles are increasing in complexity and size. For example, the hybrid vehicle is configured to include a traveling battery, a system battery, an external power supply circuit for plug-in use, a DC/DC converter for supplying a traveling motor with direct current (DC) power from the traveling battery, a DC/AC converter for converting the DC power from the traveling battery into alternating current (AC) power, a DC/DC converter for supplying an electric power steering (EPS) with the DC power from the traveling battery, a DC/DC converter for supplying accessory equipment with the DC power from the travelling battery, etc. This causes the hybrid vehicle including these components to have a complicated circuit configuration.

Under the circumstances, multi-port power supplies having multiple inputs and outputs arranged in one circuit are being developed. It has been suggested that wiring, semiconductor devices, and the like are shared by means of the multi-port power supplies, to thereby downsize power supply circuitry.

JP 2011-193713 A discloses a power conversion circuit having four ports, in which electric power can be converted between arbitrary ports selected from among the four ports.

In such a power conversion circuit having multiple ports, there is a possibility that a circulating current that does not function to transmit electric power may be created by error components resulting from dead time, voltage variations, or other factors. In the conventional art, however, no attention has been paid to the circulating current, resulting in a problem that conversion efficiency is reduced by the presence of the circulating current. As used herein, the circulating current denotes a current that should, under ideal conditions, become zero when a closed circuit is created by turning on the two upper or the two lower switches among the four switches constituting a full bridge, yet could flow through the closed circuit due to an inductance component in a coupling reactor, a resistance component in each part, or other components.

SUMMARY

The present invention advantageously provides a circuit system in which a circulating current can be accurately detected and accordingly reduced to thereby improve conversion efficiency.

A power conversion circuit system according to the present invention includes a primary conversion circuit having left and right arms between a primary positive bus and a primary negative bus, in which each of the left and right arms includes two switching transistors connected in series and a primary coil of a transformer is connected between a connection point of the two switching transistors in the left arm and a connection point of the two switching transistors in the right arm; a secondary conversion circuit having left and right arms between a secondary positive bus and a secondary negative bus, in which each of the left and right arms of the secondary conversion circuit includes two switching transistors connected in series and a secondary coil of the transformer is connected between a connection point of the two switching transistors in the left arm and a connection point of the two switching transistors in the right arm; and a control circuit for controlling switching of the switching transistors in the primary and secondary conversion circuits. In the power conversion circuit system, the control circuit detects a circulating current at at least one of timings lagged by $\pi/2+\phi/2$ (where $\phi$ is a phase difference between the primary conversion circuit and the secondary conversion circuit) from at least either a peak timing or a valley timing in a carrier counter and performs feedback control for reducing the detected circulating current to zero.

In the present invention, when electric power is transmitted between the primary conversion circuit and the secondary conversion circuit, the phase difference $\phi$ between the primary and secondary power conversion circuits is controlled. With consideration to a situation that the timing of occurrence of the circulating current may change depending on the phase difference $\phi$, the detection timing of the circulating current is adaptively determined based on the phase difference $\phi$. At the timing lagged by $\pi/2+\phi/2$ from either the peak timing or the valley timing in the carrier counter, because the detection is minimally influenced by a change in a current value relative to a period prior to or subsequent to the lagged timing, the circulating current can be detected with a high degree of accuracy.

According to one embodiment of the present invention, the control circuit detects the circulating current from a differential current between currents in the left and right arms of the primary power conversion circuit and performs the feedback control using the thus-detected circulating current.

According to another embodiment of the present invention, the differential current is detected by a single current sensor differentially connected to the left and right arms.

According to the present invention, the circulating current, which is a contributing factor to deteriorated efficiency, can be reliably reduced by detecting the circulating current with high precision and performing the feedback control to suppress the circulating current, which can ensure improved power conversion efficiency.

BRIEF DESCRIPTION OF THE DRAWINGS

The present invention will be further described with reference to the accompanying drawings, wherein like reference numerals refer to like parts in the several views, and wherein.

DETAILED DESCRIPTION

In the following, embodiments of the present invention will be described with reference to the drawings.

Figure 1:
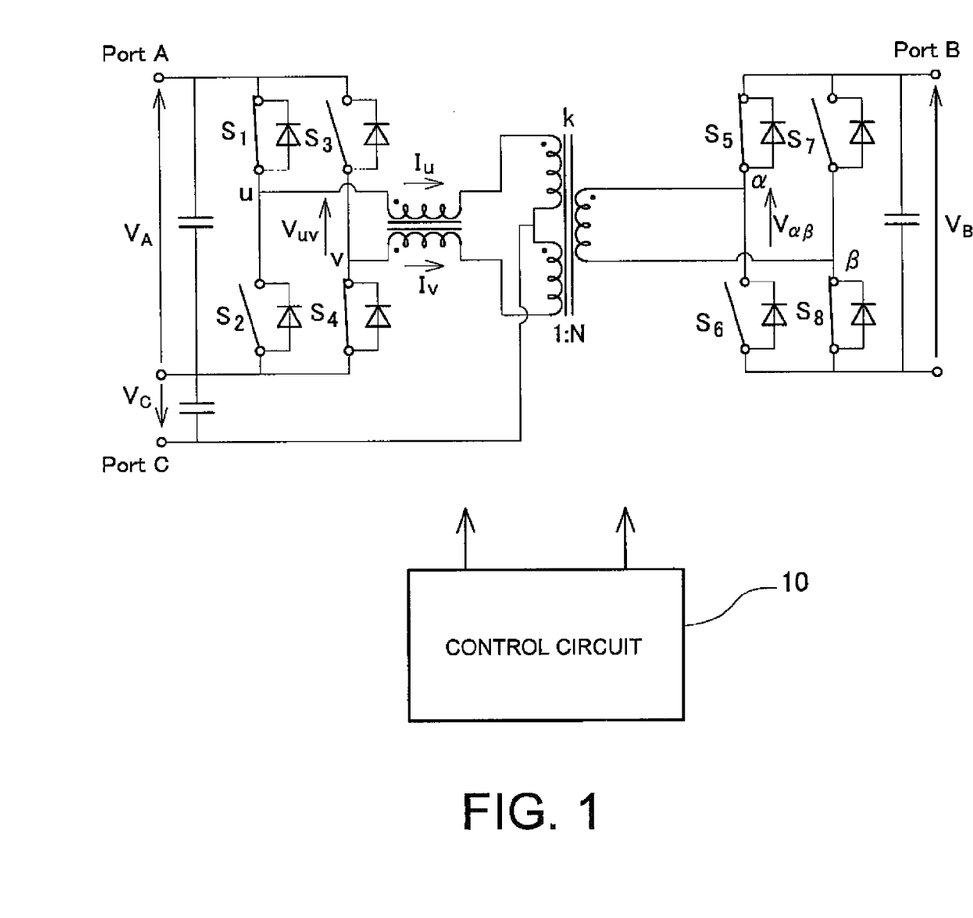
FIG. 1 is a diagram showing a circuit configuration according to an embodiment of the present invention.

FIG. 1 is a diagram showing a circuit configuration of a power conversion circuit system according to an embodiment of the present invention. The power conversion circuit system includes a control circuit 10 and a power conversion circuit 12. The power conversion circuit 12 is a multiport circuit having three ports, in which electric power can be bidirectionally transmitted among three direct current power supplies using a magnetic coupling reactor.

The multiport circuit has parts A and C in a primary conversion circuit and a port B in a secondary conversion circuit.

The primary conversion circuit includes, between positive and negative buses thereof, a left arm composed of switching transistors S1 and S2 serially connected to each other and a right arm composed of switching transistors S3 and S4 serially connected to each other, and the left and right arms are connected in parallel to each other to form a full bridge circuit. The port A is placed between the positive and negative buses of the primary conversion circuit. A voltage input to or output from the port A is defined as VA. The port C is placed between the negative bus of the primary conversion circuit and a transformer. A voltage input to or output from the port C is defined as VC.

Magnetic coupling reactors serially connected to each other and a primary coil of the transformer are connected between a connection point of the switching transistors S1 and S2 constituting the left arm and a connection point of the switching transistors S3 and S4 constituting the right arm. In other words, the magnetic coupling reactors and the primary coil of the transformer are connected to an intermediate point between two bidirectional chopper circuits.

Meanwhile, the secondary conversion circuit includes, between positive and negative buses thereof, a left arm composed of switching transistors S5 an S6 serially connected to each other and a right arm composed of switching transistors S7 and S8 serially connected to each other, and the left and right arms are connected in parallel to each other to form a full bridge circuit. The port B is placed between the positive and negative buses of the secondary conversion circuit. A voltage input to or output from the port B is defined as VB.

A secondary coil of the transformer is connected between a connection point of the switching transistors S5 and S6 constituting the left arm and a connection point of the switching transistors S7 and S9 constituting the right arm.

The control circuit 10 sets various parameters used for controlling the power conversion circuit 12, and performs switching control on the switching transistors S1 to S8 in the primary and secondary conversion circuits. The control circuit 10 switches, based on an externally applied mode signal, between a mode of performing power conversion between the two ports in the primary conversion circuit and a mode of performing insulated power transmission between primary and secondary sides. To put it in terms of the ports, the circuit is operated as an insulated bidirectional converter between the ports A and B, and operated as a non-insulated bidirectional converter between the ports A and C. Here, power transmission is performed using a leakage inductance component under operation of the insulated bidirectional converter in consideration of the magnetic fluxes which are mutually weakened in the magnetic coupling reactor, and is performed using the sum of an excitation inductance component and the leakage inductance component under operation of the non-insulated bidirectional converter in consideration of the magnetic fluxes which are mutually reinforced in the magnetic coupling reactor.

The insulated power transmission between the primary conversion circuit and the secondary conversion circuit is controlled using a phase difference $\phi$ in switching cycles of the switching transistors S1 to S8 in the primary and secondary conversion circuits.

When electric power is transmitted from the primary conversion circuit to the secondary conversion circuit, the phase difference $\phi$ is determined in such a manner that the primary side has a leading phase relative to the secondary side. On the other hand, when electric power is transmitted from the secondary conversion circuit to the primary conversion circuit, the phase difference $\phi$ is determined in an opposite way in which the primary side has a lagging phase relative to the secondary side. To transmit electric power from the secondary conversion circuit to the primary conversion circuit, for example, the switching transistors S1 and S4 are turned on while the switching transistors S2 and S3 are turned off in the primary conversion circuit, and the switching transistors S5 and S8 are turned on while the switching transistors S6 and S7 are turned off in the secondary conversion circuit. In the secondary conversion circuit, the current flows in the order of: S5→transformer's secondary coil→S8. In the primary conversion circuit, the current flows in the order of: S4→transformer's primary coil→S1.

In a subsequent period, the switching transistors S1, S4 and S8 are maintained in the ON state while the remaining switching transistors are maintained in or turned to the OFF state. As compared to the previous period, the switching transistor S5 transitions from the ON state to the OFF state. After the switching transistor S5 in the secondary conversion circuit is turned off, the current continues to flow through a diode connected in parallel with the switching transistor S6, which causes the voltage across the secondary side to drop to zero. This means that the voltage across the secondary side is defined by the ON/OFF state of the switching transistor S5.

In a further subsequent period, the switching transistor S6 is turned on, so that the switching transistors S1, S4, S6, and S8 are in the ON state while the remaining transistors are in the off state.

In a still further subsequent period, the switching transistors S4, S6, and S8 are maintained in the ON state, while the remaining transistors are maintained in or turned to the OFF state, so that the switching transistor S1 in the primary conversion circuit transitions from the ON state to the OFF state. After this transition of the switching transistor S1, the current continues to flow through a diode connected in parallel with the switching transistor S1, and the voltage across the primary side does not reach zero unless the switching transistor S2 is turned on. This means that the voltage across the primary side is determined by the ON/OFF state of the switching transistor S2.

A dead time of several hundred nanoseconds to several tens of microseconds may be set to prevent the upper and lower switching transistors from developing a short circuit. In other words, a time period in which both of the switching transistors S1 and S2, the switching transistors S3 and S4, the switching transistors S5 and S6, and/or the switching transistors S7 and S8 are turned off may be included. This can prevent the short circuit, but cannot prevent generation of the circulating current, as described above, between the full bridge circuit and the transformer by the inductance component of the coupling reactor, the resistance component in each part, and other components.

For this reason, generation of the circulating current is detected at a specific timing to prevent the circulating current.

Figure 2:
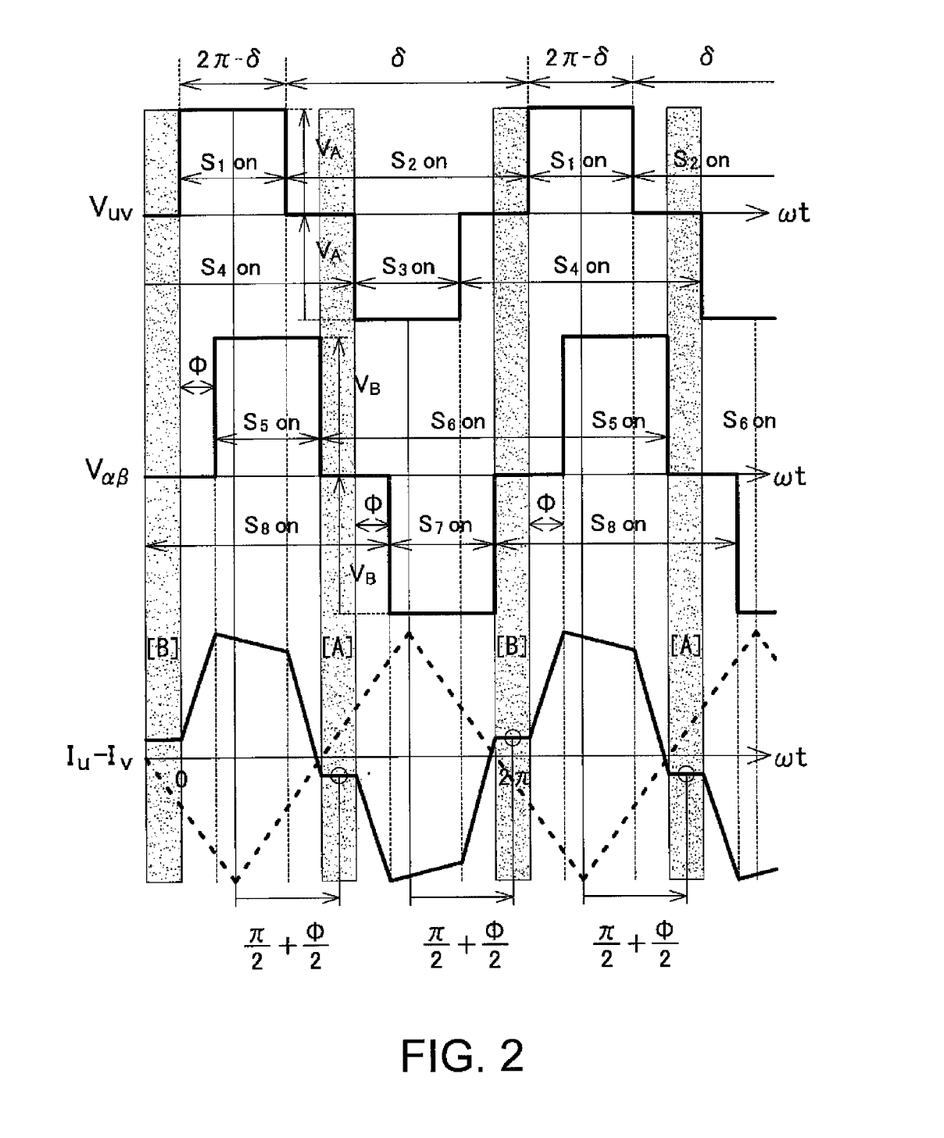
FIG. 2 is a diagram showing an operating waveform, carrier counter values, and circulating current sampling timing in the embodiment.

FIG. 2 shows a relationship among an operating waveform in the presence of the circulating current, a carrier counter value, and a circulating current sampling timing. In FIG. 2, a current existing in periods [A] and [B] is the circulating current. FIG. 2 further shows a phase difference $\phi$ and an ON time period $\delta$ of the switching transistor S2, etc. Reference character Vuv represents a voltage between a connection point u of the switching transistors S1 and S2 and a connection point v of the switching transistors S3 and S4 in the primary conversion circuit, reference character V$\alpha\beta$ represents a voltage between a connection point $\alpha$ of the switching transistors S5 and S6 and a connection point $\beta$ of the switching transistors S7 and S8 in the secondary conversion circuit, reference character Tu represents a current (u-phase current) flowing through the coupling reactor from the connection point u of the left arm, and reference character Iv represents a current (v-phase current) flowing through the coupling reactor from the connection point v of the right arm. The carrier counter value indicated by a broken line is of a u-phase carrier signal. Reference character Iu-Iv represents a differential current between the left and right arms; i.e. between the u-phase and v-phase currents. Essentially, in the periods [A] and [B], there should be no current and Iu-Iv is expected to be zero. In FIG. 2, however, Iu-Iv has limited current values and shows the presence of the circulating current in those periods.

Figure 3A:
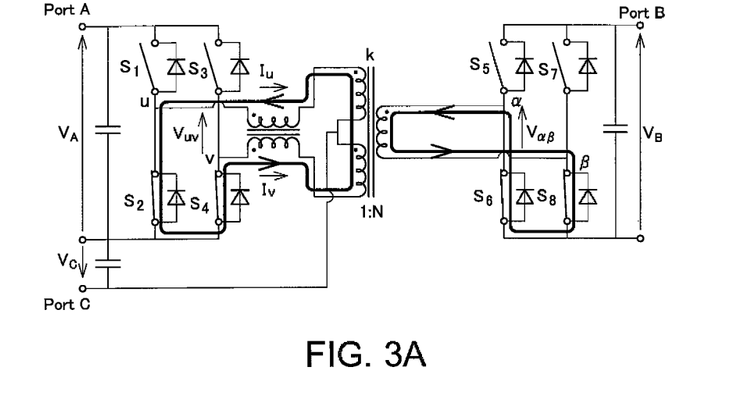
FIG. 3A is a diagram for explaining the circulating current.
Figure 3B:
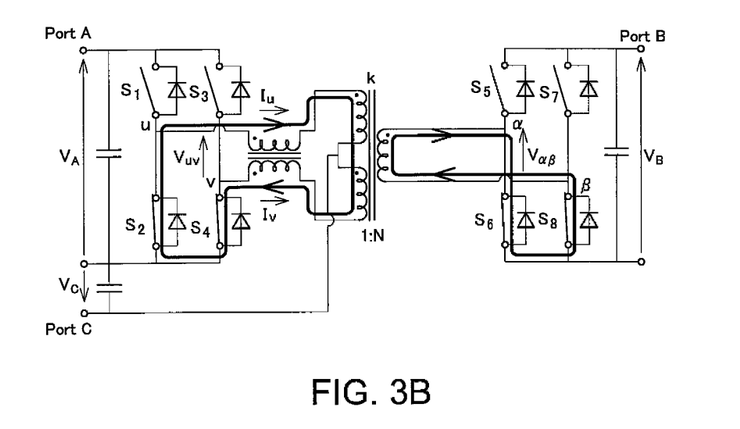
FIG. 3B is a diagram for explaining the circulating current.

FIGS. 3A and 3B show flows of the circulating currents. FIG. 3A shows the flow of the circulating current during the period [A]. In the primary conversion circuit, the current flows in the order of:
S2→S4→reactor→transformer's primary coil→reactor→S2.
In the secondary conversion circuit, the current flows in the order of:
S8→S6→transformer's secondary coil→S8. FIG. 3B shows the flow of the circulating current during the period [B]. In the primary and secondary conversion circuits, the currents respectively flow along directions opposite to those in FIG. 3A.

The circulating current is caused by components of a leakage inductance in the transformer, a leakage inductance in the coupling reactor, the resistance in each part, an error in switching timing, etc. In this embodiment, the circulating current is detected at timings indicated by round (○) marks in FIG. 2. In other words, either a peak timing or a valley timing in the carrier counter is defined as a reference timing, and a timing shifted by $\pi/2+\phi/2$ from the reference timing is defined as the circulating current sampling timing. With this setting, the sampling timing is adaptively changed as a function of the phase difference $\phi$ rather than being set to a fixed time, which ensures that the periods [A] and [B] in which the circulating current is generated can be identified reliably, to thereby detect the circulating current with high accuracy without relying on converter design values at the timing that allows the detection to be minimally influenced by a change in a current value relative to that in previous and subsequent periods. From FIG. 2 showing reference character $\phi$ as a phase difference between the voltages Vuv and V$\alpha\beta$, it can be understood that the periods [A] and [B] may vary depending on the phase difference $\phi$ and that reliable detection of the circulating current can be ensured by determining the detection timing of the circulating current based on the phase difference $\phi$.

Further, when the circulating current sampling timing is set to $\pi/2+\phi/2$, the timing of $\pi/2+\phi/2$ matches a zero cross point in an ideal current waveform in a period in which the circulating current is absent, which has an advantageous effect that a control target value may be maintained at zero in that period.

Figure 4A:
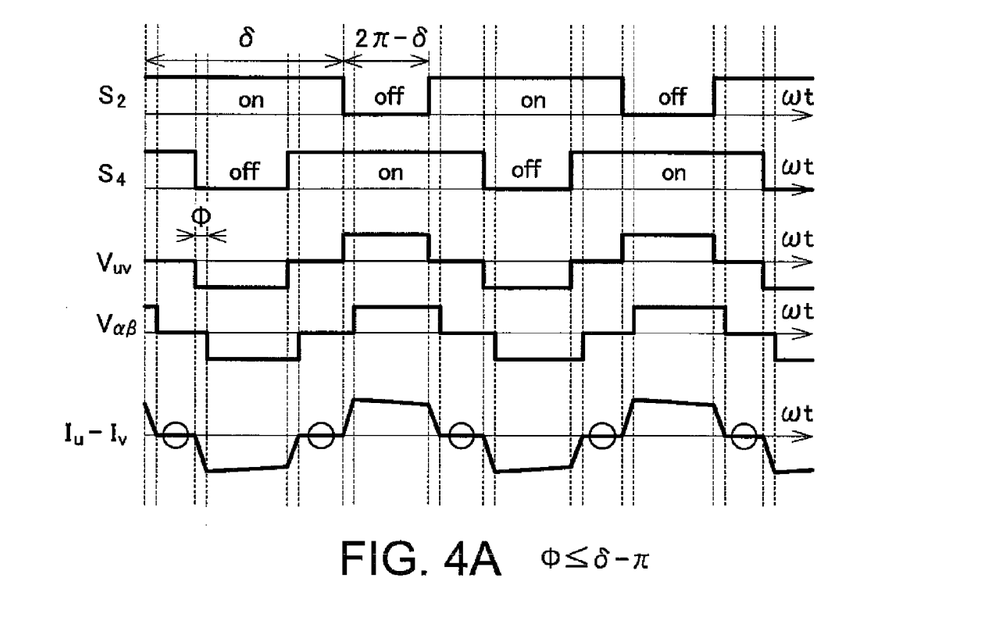
FIG. 4A is a diagram showing an ideal waveform under the condition of $\phi \leq \delta - \pi$.
Figure 4B:
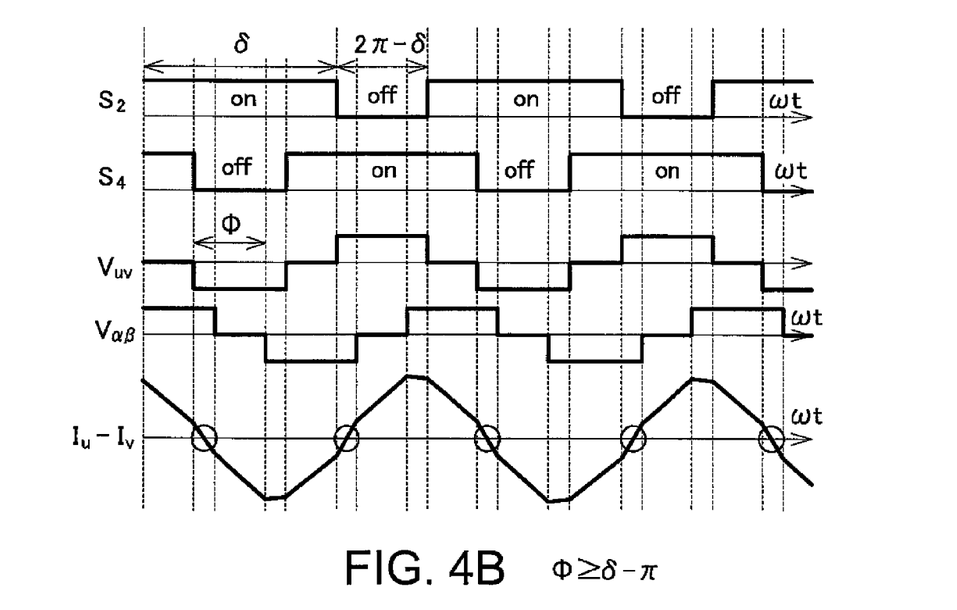
FIG. 4B is a diagram showing an ideal waveform under the condition of $\phi \geq \delta - \pi$.

FIGS. 4A and 4B show ideal operating waveforms. FIG. 4A shows the ideal waveform when $\phi \leq \delta-\pi$, and FIG. 4B shows the ideal waveforms when $\phi \geq \delta-\pi$. When $\phi \geq \delta-\pi$ as shown in FIG. 4B, there is no circulating current period, and the sampling timing of $\pi/2+\phi/2$ matches, in this case, a zero cross timing in the ideal current waveform. Therefore, the control target value can be maintained at zero, and there is no need to stop operation of controlling the circulating current. This can contribute to easy configuration of control operation.

Figure 5:
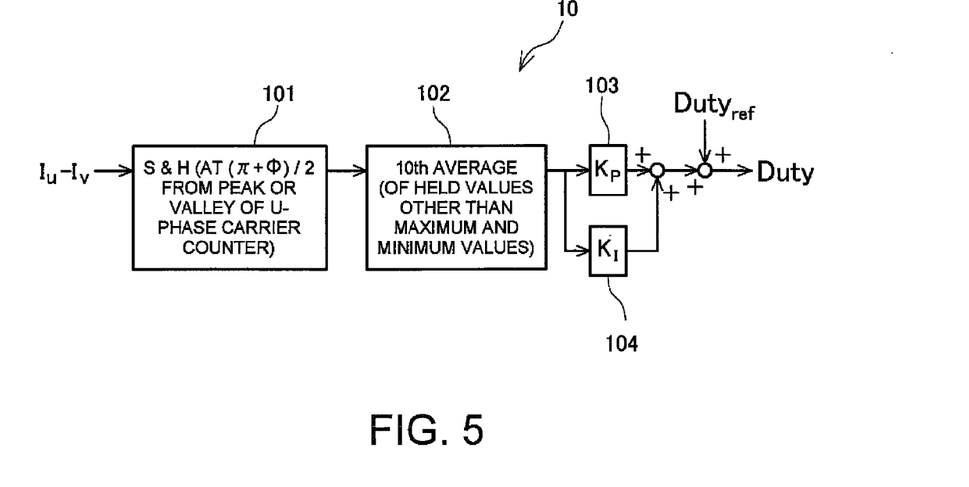
FIG. 5 is a block diagram showing a configuration of a control circuit in the embodiment.

FIG. 5 shows a functional block diagram of the control circuit 10. The control circuit 10 includes a sampling and holding unit 101, an average calculating unit 102 and further includes a proportionating unit 103 and an integrating unit 104 which are components of a PT control unit.

The sampling and holding unit 101 uses a carrier counter value to sample and hold a value of the current Iu-Iv in the primary conversion circuit at a timing lagged by $\pi/2+\phi/2$ from a peak or a valley of the counter value.

The average calculating unit 102 calculates a tenth moving average of a series of the sampled and held values from which maximum and minimum values are eliminated.

The proportionating unit 103 in the PI controller outputs a value obtained by multiplying the moving average by a proportional gain Kp.

The integrating unit 104 in the PI controller outputs a value obtained by multiplying the moving average by an integration gain KI.

The values output from the proportionating unit 103 and the integrating unit 104 are summed, and a summed result is added to a reference duty Dutyref to obtain a command duty Duty, which is output for feedback control.

Here, the differential current Iu-Iv in the primary conversion circuit is detected, and a current ripple component caused by operation of the non-insulated bidirectional converter is removed from the differential current Iu-Iv to obtain the circulating current in the primary conversion circuit. The thus-obtained circulating current is used for feedback to suppress the circulating current in the primary conversion circuit with a greater degree of accuracy, because the decrease in efficiency is greatly affected by the circulating current in the primary conversion circuit. It should be noted that use of the differential current Iu-Iv for the purpose of removing the current ripple component necessitates mounting current sensors for detecting the u-phase current Iu and the v-phase current Iv, respectively. The current sensors may be simplified, and an arrangement to simplify the mounting of the current sensors will be described below. Meanwhile, sample and hold operation of the sampling and holding unit 101 is not necessarily performed each time.

Figure 6:
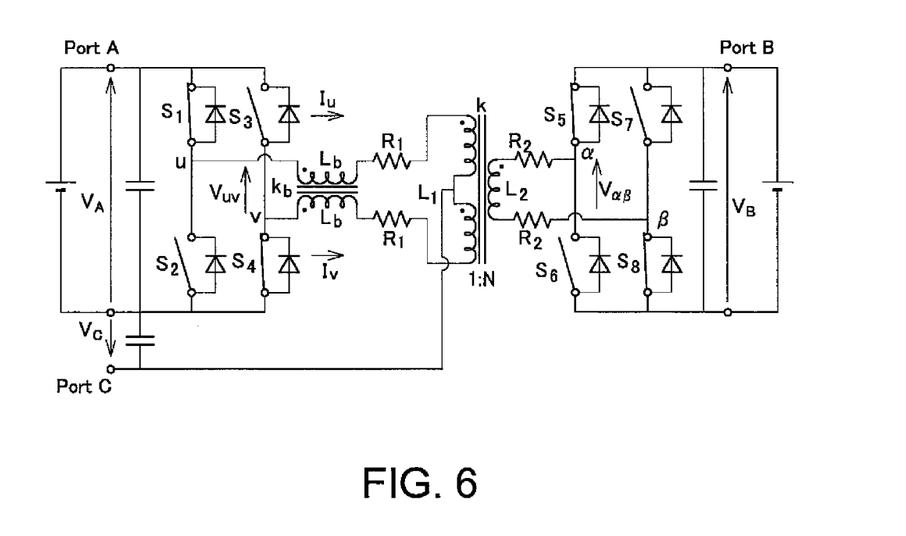
FIG. 6 is a simulated circuit diagram in the embodiment.

FIG. 6 shows a simulated circuit model according to this embodiment, in which the circuit shown in FIG. 1 is simulated, taking an inductance of the magnetic coupling reactor as Lb, a coupling coefficient as kb, a resistance component as R1 in the primary conversion circuit, taking inductances of the primary and secondary coils in the transformer as L1 and L2, respectively, and taking a resistance component as R2 in the secondary conversion circuit. The primary conversion circuit has the port A and the port C, and the secondary conversion circuit has the port B. Parameters of circuit elements are listed below.

L1: 60 μH
L2: 960 μH
k: 0.995
Lb: 3.4 μH
kb: 0.96
R1: 40 mΩ
R2: 640 mΩ
VA: 50V
VB: 200V
VC: 14V
Carrier Frequency: 40 kHz
Dead Time: 0.1 μs
N: 4

Defining the primary conversion circuit as a low voltage side and the secondary conversion circuit as a high voltage side, it is assumed that a constant power is transmitted from the port B of the secondary conversion circuit to the port A of the primary conversion circuit. Efficiency in transmission of the constant power under control according to this embodiment is compared with that performed without the control.

Figure 7A:
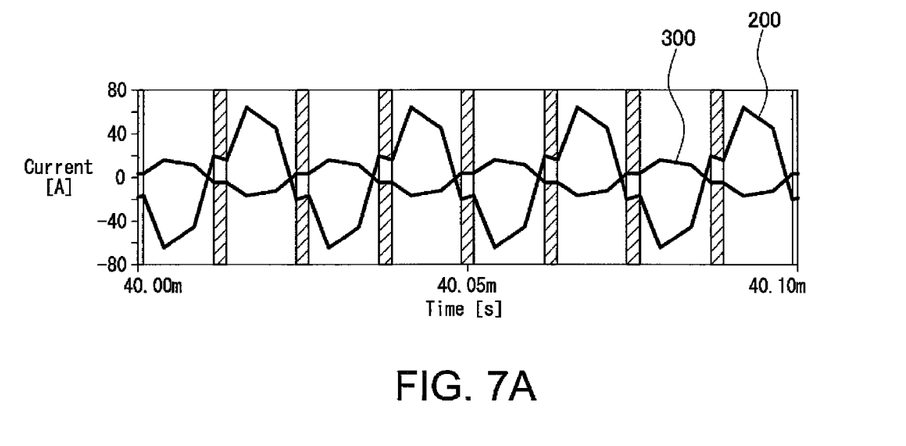
FIG. 7A is a diagram showing simulated current waveforms according to the conventional art.
Figure 7B:
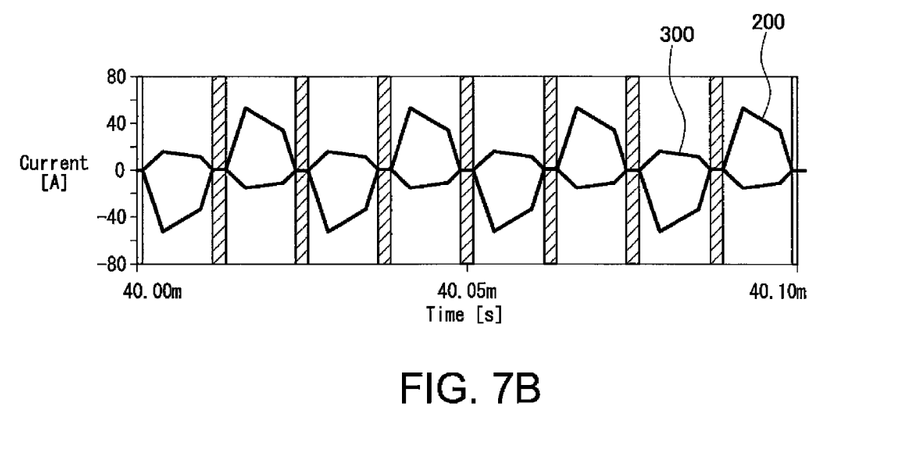
FIG. 7B is a diagram showing simulated current waveforms according to the embodiment.

FIGS. 7A and 7B show simulated waveforms of currents flowing through the primary side and the secondary side of the transformer when 1 kW power is transmitted. The horizontal axis indicates time (s) and the vertical axis indicates the currents (A). Reference numeral 200 represents a current (Iu-Iv)/2 in the primary side of the transformer, and reference numeral 300 represents a current in the secondary side of the transformer. FIG. 7A shows the current waveforms according to the conventional art, and FIG. 7B shows the current waveforms according to this embodiment. The current in each hatched period is the circulating current. From a comparison between FIGS. 7A and 7B, it can be understood that the current (Iu-Iv)/2 of the primary side is almost reduced to zero in the hatched periods, and the current of the secondary side is also close to zero in the periods. According to this embodiment, the circulating current can be reduced effectively.

Figure 8:
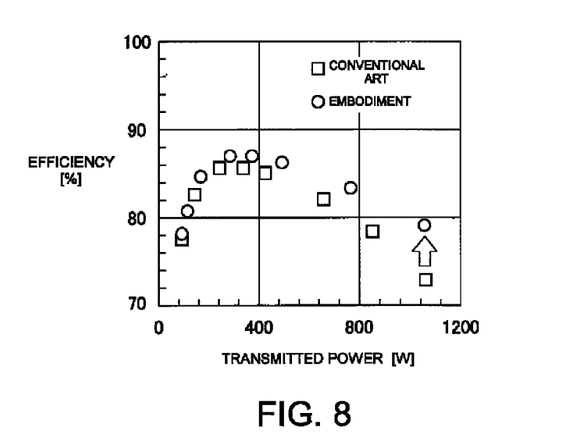
FIG. 8 shows a simulation result according to the embodiment.

FIG. 8 shows changes in transmission efficiency relative to values of transmitted power according to the circuit simulation. The horizontal axis indicates the transmitted power (W) and the vertical axis indicates the efficiency (%). In FIG. 8, both values of the efficiency in the conventional art performing no control of this embodiment and the efficiency under the control of this embodiment are plotted on the same graph. As the transmitted power becomes greater, the efficiency in this embodiment is increased. For the transmitted power of 1 kW, the efficiency in this embodiment is approximately 6% higher than that in the conventional art, as indicated by an arrow. Needless to say, this superiority is attained by reducing the unnecessary circulating current that does not contribute to transmission of power.

Although the embodiment of the invention has been described above, the present invention is not limited to the described embodiment and may be changed in various ways.

For example, in the above-described embodiment, the differential current Iu-Iv between the u-phase current Iu and the v-phase current Iv in the primary conversion circuit is sampled and held at the specific sampling timing, which requires that the sensor for detecting the u-phase current Iu and the sensor for detecting the v-phase current Iv be separately mounted. The differential current Iu-Iv may be detected by a single current sensor.

Figure 9:
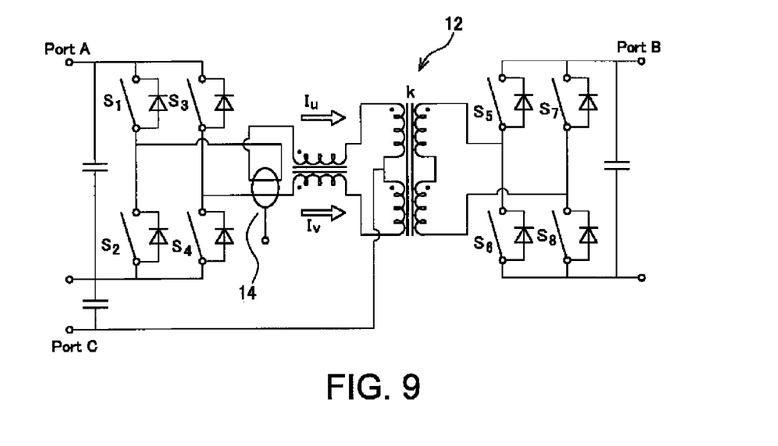
FIG. 9 is a diagram showing a circuit configuration according to another embodiment.

FIG. 9 shows a differential connection scheme for detecting the differential current Iu-Iv in the primary conversion circuit by means of a single current sensor 14 in the power conversion circuit 12 according to another embodiment. The current sensor 14 is differentially connected to a u-phase line and a v-phase line. With this arrangement, the number of the current sensors such as current transformers (CTs) may be reduced from two to one, so that the circuit configuration can be further simplified.

Further, as shown in FIG. 5, in the above-described embodiment the sampling and holding unit 101 in the control circuit 10 detects the circulating current at the timing lagged by $\pi/2+\phi/2$ from the peak or valley of the carrier counter value. This detection may include:

(1) detecting the circulating current at the timing lagged by $\pi/2+\phi/2$ from the peak of the carrier counter value;
(2) detecting the circulating current at the timing lagged by $\pi/2+\phi/2$ from the valley of the carrier counter value; and
(3) detecting the circulating current at the timing lagged by $\pi/2+\phi/2$ from the peak and the valley of the carrier counter value. It should be noted that the sampling and holding unit 101 does not necessarily detect the circulating current at every timing lagged by $\pi/2+\phi/2$ from each peak or each valley of the carrier counter value, and may detect the circulating current at least once at one of the timings. Specifically, the timings lagged by $\pi/2+\phi/2$ from the peaks or valleys of the carrier counter value are defined as t1, t2, t3, t4 . . . , and the circulating current may be detected at the timings t1 and t2 while performing no detection at the timings t3 and t4, or may be detected at other timings. In other words, the circulating current may be preferably detected at at least one of the timings lagged by $\pi/2+\phi/2$ from at least either a peak timing or a valley timing in the carrier counter.

In this embodiment, the peak or valley of the carrier counter value is used as a reference. As shown in FIG. 2, however, the valley of the carrier counter value corresponds to an intermediate timing in a period in which the switching transistor S1 in the primary conversion circuit is in the ON state, while the peak of the carrier counter value corresponds to an intermediate timing in a period in which the switching transistor S3 in the primary conversion circuit is in the ON state. Accordingly, using the peak or valley of the carrier counter value as the reference is equivalent, in a technical sense, to using as the reference a predetermined timing in on/off periods of the switching transistors.

Although in this embodiment the circulating current is detected at the timing lagged by $\pi/2+\phi/2$ from the peak or valley of the carrier counter value, it is to be understood that the present invention includes a technique of performing the detection at a time when a short length of time Δt is delayed or advanced from the above-described detection timing. That is, at the timing lagged by $\pi/2+\phi/2$ from the peak or valley of the carrier counter value, the influence exerted by the change in the current value relative to that in the previous or subsequent time period is assumed to be minimum, and such a small temporal difference of $\Delta t$ may be regarded as an allowable variation in the scope of the technical idea of this invention.

The invention claimed is:

1. A power conversion circuit system comprising:
    a primary conversion circuit having left and right arms between a primary positive bus and a primary negative bus, each of the left and right arms including two switching transistors connected in series, wherein a primary coil of a transformer is connected between a connection point of the two switching transistors in the left arm and a connection point of the two switching transistors in the right arm;
    a secondary conversion circuit having left and right arms between a secondary positive bus and a secondary negative bus, each of the left and right arms of the secondary conversion circuit including two switching transistors connected in series, wherein a secondary coil of the transformer is connected between a connection point of the two switching transistors in the left arm of the secondary conversion circuit and a connection point of the two switching transistors in the right arm of the secondary conversion circuit, and
    a control circuit that controls switching of the switching transistors in the primary conversion circuit and in the secondary conversion circuit, wherein;
    the control circuit detects a circulating current at timings lagged by $\pi/2+\phi/2$ from at least either a peak timing or a valley timing in a carrier counter, where $\phi$ represents a difference in phase between the primary and secondary conversion circuits, and the control circuit performs feedback control to reduce the detected circulating current to zero.

2. The power conversion circuit system according to claim 1, wherein the control circuit performs the feedback control using the circulating current detected from a differential current between currents flowing through the left and right arms of the primary conversion circuit.

3. The power conversion circuit system according to claim 2, wherein the differential current is detected by a single current sensor differentially connected to the left and right arms of the primary conversion circuit.

* * * * *